US011812893B2

(12) United States Patent
Manos (10) Patent No.: US 11,812,893 B2
(45) Date of Patent: *Nov. 14, 2023

(54) STORABLE GRILL

(71) Applicant: Chris Stephen Manos, Grosse Pointe, MI (US)

(72) Inventor: Chris Stephen Manos, Grosse Pointe, MI (US)

(*) Notice: Subject to any disclaimer, the term of this patent is extended or adjusted under 35 U.S.C. 154(b) by 568 days.

This patent is subject to a terminal disclaimer.

(21) Appl. No.: 16/985,766

(22) Filed: Aug. 5, 2020

(65) Prior Publication Data
US 2020/0359837 A1    Nov. 19, 2020

Related U.S. Application Data

(63) Continuation of application No. 15/476,079, filed on Mar. 31, 2017, now Pat. No. 10,736,461.

(51) Int. Cl.
*A47J 37/04* (2006.01)
*A47J 37/07* (2006.01)

(52) U.S. Cl.
CPC ...... *A47J 37/041* (2013.01); *A47J 2037/0777* (2013.01)

(58) Field of Classification Search
CPC .................. A47J 37/0704; A47J 37/041; A47J 2037/0777
See application file for complete search history.

(56) References Cited

U.S. PATENT DOCUMENTS

| 2,821,905 | A | 2/1958 | Culligan |
| 2,983,308 | A | 5/1961 | Horowitz |
| 3,059,568 | A | 10/1962 | Fortis |
| 4,867,130 | A | 9/1989 | Walker |
| 5,410,950 | A | 5/1995 | Rone |
| 6,439,221 | B1* | 8/2002 | Ward ............... A47J 37/0704 126/25 R |
| 7,958,882 | B1 | 6/2011 | Sgourides |
| 8,770,182 | B2 | 7/2014 | Christopoulos |
| 10,736,461 | B2* | 8/2020 | Manos ............... A47J 37/041 |
| 2005/0087182 | A1* | 4/2005 | Schulte ............. A47J 37/0704 126/38 |
| 2005/0252504 | A1 | 11/2005 | Cabrera et al. |
| 2008/0168976 | A1 | 7/2008 | Simsack |
| 2011/0094493 | A1* | 4/2011 | Malumyan ......... A47J 37/0704 126/25 R |
| 2012/0216790 | A1 | 8/2012 | Hopkins |
| 2017/0307225 | A1 | 10/2017 | Curtis et al. |
| 2022/0007887 | A1* | 1/2022 | Manos ............... A47J 37/0704 |

FOREIGN PATENT DOCUMENTS

EP    1994865 A1    11/2008

* cited by examiner

*Primary Examiner* — Alfred Basichas
(74) *Attorney, Agent, or Firm* — Fishman Stewart PLLC (57) ABSTRACT

A system for storing a grill generally may include the grill and a corresponding base. The grill may have a grill body defining a cavity, and at least two legs extending from the grill body. The legs may be movable between an extended state and a collapsed state. The base may have a frame assembly selectively attachable to the grill body. When the frame assembly and grill body are attached to each other, the grill may be movable between a usable position to a storable position. A footprint of the grill may be smaller in the storable position than in the usable position.

22 Claims, 6 Drawing Sheets

STORABLE GRILL

CROSS-REFERENCE TO RELATED APPLICATIONS

This application claims priority to U.S. patent application Ser. No. 15/476,079 filed Mar. 31, 2017, which issued as U.S. Pat. No. 10,736,461 on Aug. 11, 2020, and is hereby incorporated by reference in its entirety.

FIELD OF TECHNOLOGY

The present disclosure pertains to a storable grill, including, but not limited to, a rotisserie grill.

BACKGROUND

Grills for outdoor cooking, such as rotisserie grills, can be very large in size. Thus, it may be impractical to leave outside. However, to store the grill indoors may require a lot of square footage, and in addition, the large size may make it difficult to move the grill back and forth between storage and use.

Accordingly, there exists a need for an improved grill that requires less space when being stored.

BRIEF DESCRIPTION OF THE DRAWINGS

Referring now to the drawings, illustrative embodiments are shown in detail. Although the drawings represent some embodiments, the drawings are not necessarily to scale and certain features may be exaggerated, removed, or partially sectioned to better illustrate and explain the present disclosure. Further, the embodiments set forth herein are not intended to be exhaustive or otherwise limit or restrict the claims to the precise forms and configurations shown in the drawings and disclosed in the following detailed description.

DETAILED DESCRIPTION

An exemplary storable grill may include a grill body defining a cavity, and at least two legs extending from the grill body. The legs may be movable between an extended state and a collapsed state. The grill body may be movable between a usable position and a storable position, wherein a footprint of the grill may be smaller in the storable position than in the usable position. As such, the grill may require less space and therefore be more easily stored.

An exemplary system for storing a grill generally may include the grill and a corresponding base. The grill may have a grill body defining a cavity, and at least two legs extending from the grill body. The legs may be movable between an extended state and a stowed state. The base may have a frame assembly selectively attachable to the grill body. When the frame assembly and grill body are attached to each other, the grill may be movable between a usable position to a storable position, wherein a footprint of the grill may be smaller in the storable position than in the usable position.

An exemplary method for storing a grill may include first attaching a frame assembly of a base to a grill body of the grill. The method may then include moving legs of the grill from an extended position to a collapsed position. The method may further include moving the grill from a usable position to a storable position, wherein a footprint of the grill is smaller in the storable position than in the usable position.

Figure 1:
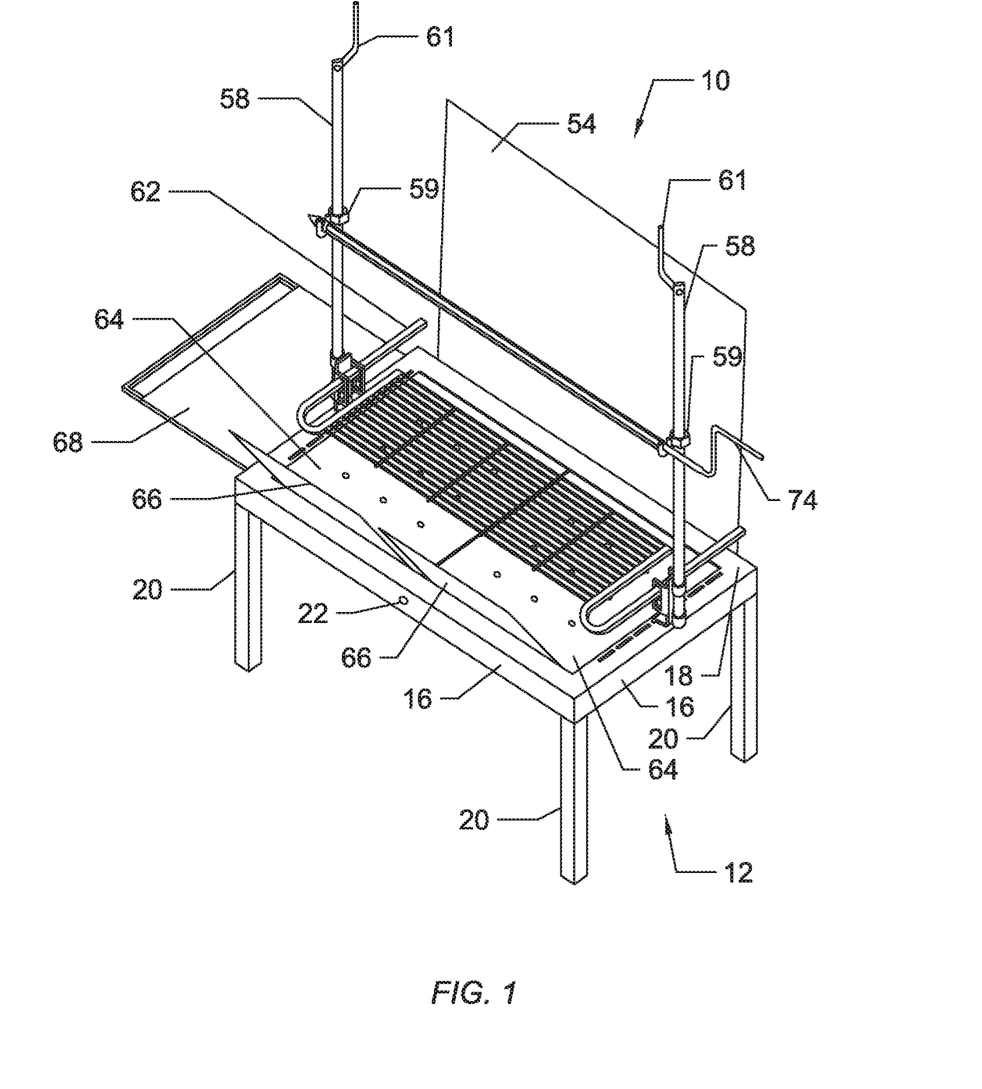
FIGS. 1 and 2 are schematic, perspective views of an exemplary storable grill in an assembled state and a disassembled state, respectively.
Figures 2, 3:
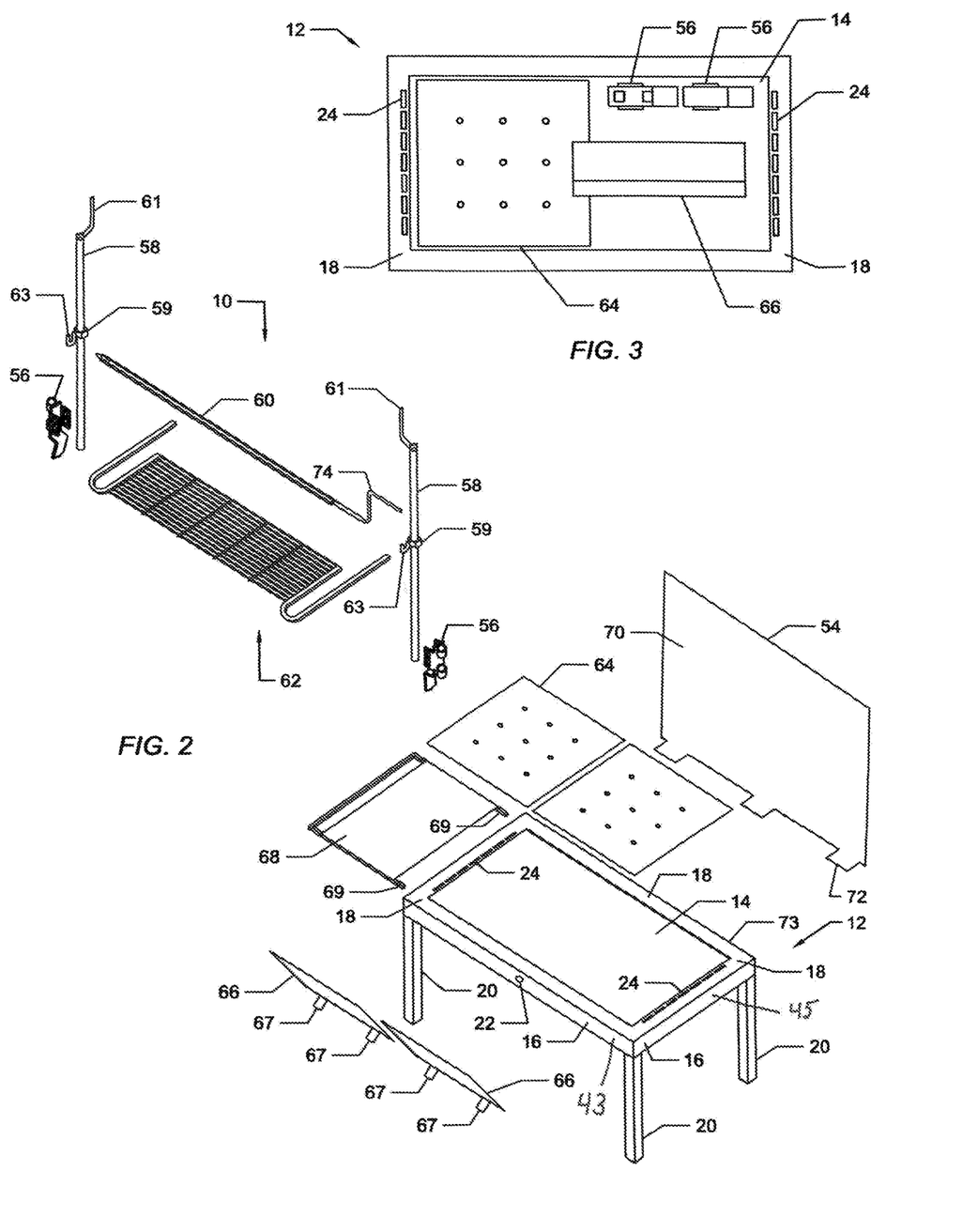
FIG. 3 is a schematic, top view of the grill of FIGS. 1 and 2.

Referring now to the figures, FIGS. 1 and 2 illustrate an exemplary storable grill 10. As described in more detail hereinafter, the grill 10 generally may be transitionable between a usable position (FIG. 1), in which the grill 10 may actively be used for cooking, and a storable position (FIG. 5E), in which the footprint of the grill 10 may be reduced. As such, the grill 10 may require less square footage of storage space when in the storable position, thereby enabling it to be more easily stored, for example, in a garage or storage shed. While FIGS. 1 and 2 illustrate the grill 10 as a rotisserie grill, it should be appreciated that grill 10 may be any kind of grill, including but not limited to, a closed grill, a smoker, and the like.

The grill 10 generally may include a grill body 12 defining a cavity 14 in which a heating source, including, but not limited to, coal, burner(s), and the like, may be disposed. The grill body 12 may have wall portions 16 forming a generally rectangular shape. It should be appreciated that the grill body 12 may have any shape, including, but not limited to, circular, elliptical, and the like, and may have any number of wall portions 16 to achieve such a shape. The grill body 12 may also have ledge portions 18 around at least a portion of the cavity 14. The wall portions 16 and/or the ledge portions 18 may be configured to receive additional components of the grill 10, as described in more detail hereinafter.

The grill 10 may also include legs 20 extending from the grill body 12. While FIGS. 1 and 2 illustrate four legs 20 generally located at corners of the grill body 12, it should be appreciated that there may be any number of legs 20 at any location along the grill body 12. For example, there may be two legs 20 at opposing sides of the grill body 12 that extend substantially along an entire length of the respective sides. In addition, while FIGS. 1 and 2 illustrate the legs 20 as generally cuboidal in shape and oriented in a straight up and down manner, it should be appreciated that the legs 20 may have any shape, e.g., having a circular, elliptical, or L-shaped cross-section, and/or orientation. For example, the legs 20 may each extend diagonally from one corner or side of the grill body 12 to an opposite corner or side, thereby crossing another leg 20 to generally form an X.

The legs 20 may be movable between an extended state and a collapsed state, which may facilitate the grill 10 moving between the usable position and the storable position. In the extended state, the legs 20 may extend from the grill body 12 to a surface on which the grill 10 may be disposed such that the grill body 12 may be supported by the legs 20 in the usable position. In the collapsed state, the legs 20 may be positioned closer to or against the grill body 12 to substantially reduce the height of the grill 10. As merely one example, the legs 20 may be attached to the grill body 12 in a rotatable manner such that they may rotate between the extended state and the collapsed state. It should be appreciated that any known mechanism for moving the legs between the two states is contemplated, including, but not limited to, a telescoping mechanism. In addition or alternatively, the legs 20 may be selectively removable from the grill body 12. The legs 20 may include a locking mechanism to lock the legs 20 in the extended state, the stowed state, or any state therebetween. The locking mechanism may include, but is not limited to, a lock, a locking pin, a locking clip, and the like.

Figure 4:
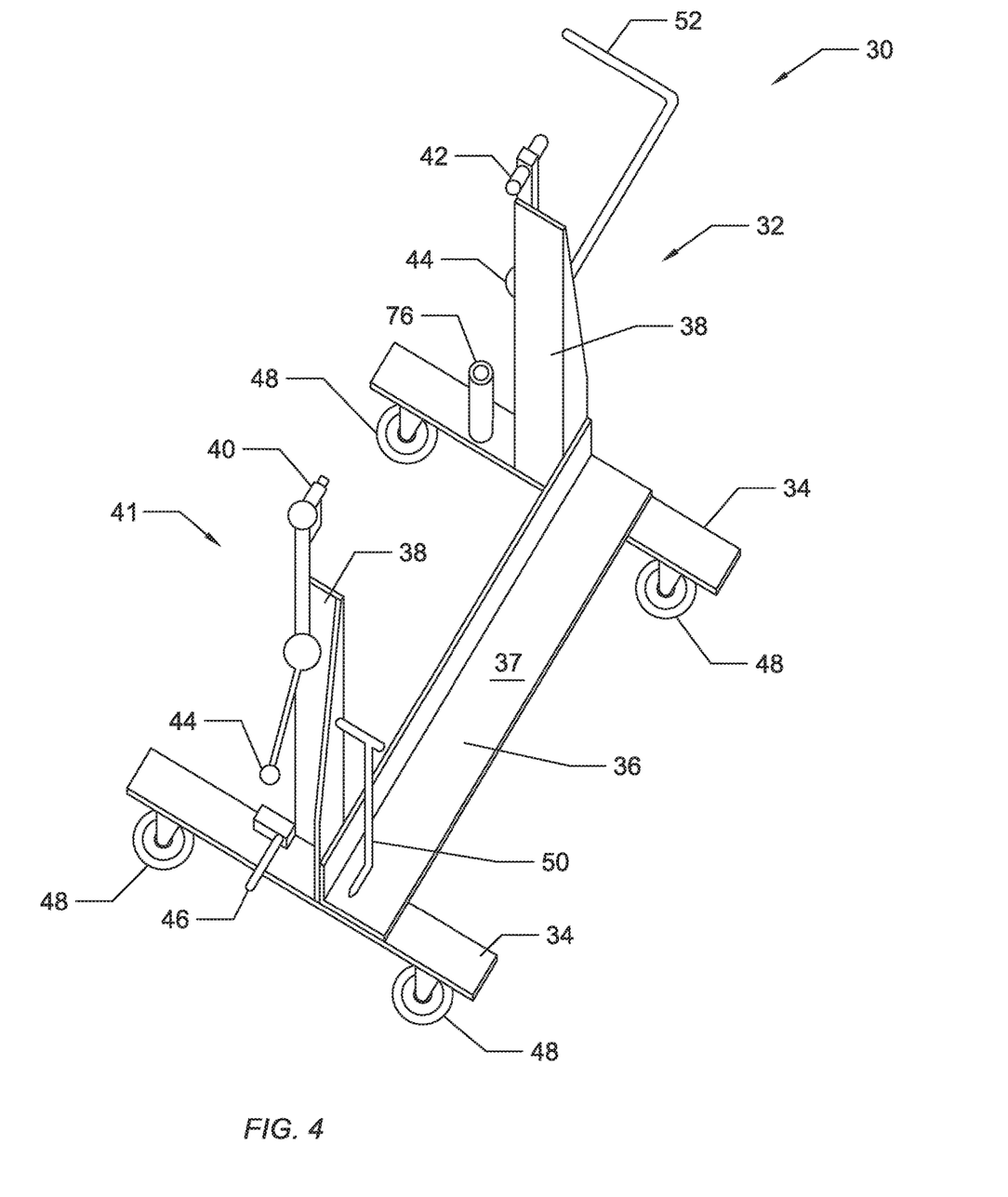
FIG. 4 is a schematic, perspective view of an exemplary base for transitioning the grill of FIGS. 1 and 2 between a usable position and a storable position.
Figure 5A:
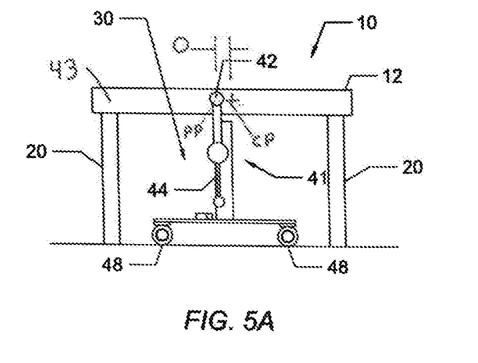
FIGS. 5A-5E are schematic illustrations of the grill of FIGS. 1 and 2 transitioning from a usable position to a storable position via the base of FIG. 4.

Referring now to FIG. 4, a base 30 may be employed to transition the grill 10 between the usable position and the storable position, and to ultimately move and store the grill 10. The base 30 generally may include a frame assembly 32 that may be selectively attachable to the grill body 12 of the grill 10, as illustrated in FIG. 5A. In one exemplary approach, the frame assembly 32 may include two support members 34 arranged substantially parallel to each other, and a cross member 36 connecting the two support members 34. The frame assembly 32 may further include two upright members 38, which each may extend upwards from one of the support members 34 and/or may abut or be secured to the cross member 36. While FIG. 4 illustrates the frame assembly 32 as having two support members 34 and corresponding upright members 38, and one cross member 36, it should be appreciated that there may be any number of support members 34, cross members 36, and upright members 38 having similar or different shapes, sizes, and/or configurations. The cross member(s) 36 may function as a platform 37 for storing equipment and/or accessories, including, but not limited to, a propane tank, a motor, and the like.

Figure 5B:
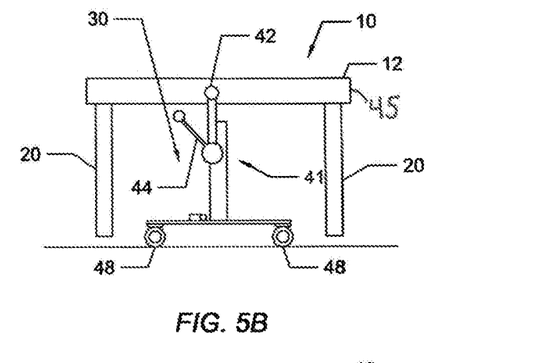

The base 30 may also include pins 40 and 42, which may each be attached to and/or extend inwardly from one of the upright members 38. As seen in FIGS. 1 and 2, the grill body 12 may have receiving holes 22, for example, in the wall portions 16, that receive or otherwise engage with one of the pins 40 and 42 such that the frame assembly 32 and the grill body 12 may be selectively attached to each other. It should be appreciated that any other known mechanisms capable of attaching the frame assembly 32 and the grill body 12 are contemplated herein. The pins 40 and 42 may each be connected to a lever 44, which may be configured to rotate the corresponding pin 40, 42. When one or more of the pins 40 or 42 is inserted into the corresponding hole 22, the corresponding lever 44 may be pulled or otherwise activated until the pin 40 or 42 is locked in place. The activation of the lever 44 may also elevate the grill 10 off of the surfaces on which it is disposed, i.e., in an elevated position, as illustrated in FIG. 5B. Thus, the lever 44 and the pins 40, 42 may function as a lift 41. One or more of the levers 44 may be connected to the upright member(s) 38 in a way to permit adjustability of a height of the grill 10 in the usable position and/or in the elevated position if desired.

Figure 5C:
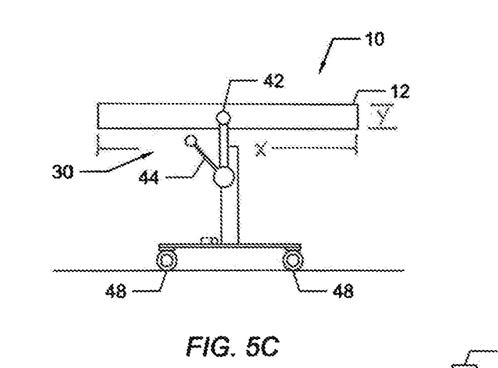
Figure 5D:
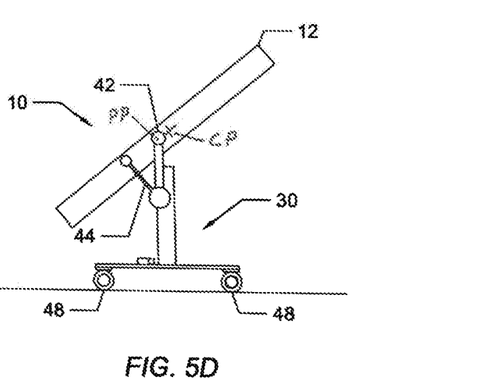
Figure 5E:
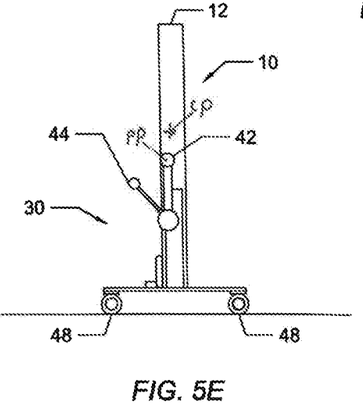

Once the grill 10 is in the elevated position, the legs 20 may be more freely moved from the extended position to the collapsed position (or alternatively removed), as illustrated in FIG. 5C. To prevent the grill 10 from undesirably moving or rotating before the legs 20 have been moved into the collapsed position, for example, tilting in one direction such that one set of legs 20 on one side of the grill 10 may no longer be elevated, the base 30 may include a kickstand 50 to maintain the grill 10 in the elevated position. As merely one example, the kickstand 50 may be selectively attachable to and removable from one of the upright members 38, and may engage with the cross member 36 and/or support members 34. The grill 10, in particular, the grill body 12, may be rotatable around the pins 40, 42 from the usable position, in which the grill body 12 may be oriented substantially horizontal with respect to the surface, to the storable position, in which the grill body 12 may be oriented substantially upright with respect to the surface, as illustrated in FIGS. 5D and 5E.

As seen in FIG. 4, the cross member 36 may be positioned and configured to stop the grill body 12 from moving or rotating beyond the storable position. The base 30 may also include a lock 46 to prevent the grill body 12 from undesirably moving or rotating back towards the usable position. The lock 46 may include a member movable, for example, rotatable and/or slidable, between a locking position in which the member is in front of the grill body 12, and an unlocking position in which the member is clear of the grill body 12. One or more lock(s) 46 may be secured to the support member(s) 34. It should be appreciated that any known device and/or mechanism capable of selectively restricting and/or preventing free movement or rotation of the grill body 12 is contemplated.

The base 30 may also include wheels 48 attached to the support members 34 and/or the cross member(s) 36. In one exemplary approach, the wheels 48 may be casters to allow the base 30, with or without the grill 10 attached thereto, to freely move in multiple directions, though any type of wheels may be used. The wheels 48 may be detachable and/or lockable to prevent undesirable movement (e.g., rolling) of the base 30, for example, when the base 30 and grill 10 are in a desired storage location. The base 30 may further include a handle 52, which may be attached to one of the upright members 38, by which the base 30, with or without the grill 10, may be pushed or pulled.

Referring back to FIGS. 1 and 2, the grill 10 may have a modular configuration where additional components may be selectively added and removed to the grill 10 for additional and/or improved functionality. The additional components may include, but are not limited to, a lid 54, brackets 56, support posts 58, a skewer 60, a grate 62, coal trays 64, heat deflectors 66, and/or a side table (or cutting board) 68. At least some of these additional components, such as the brackets 56, support posts 58, skewer 60, grate 62, coal trays 64, heat deflectors 66, and side table 68, may be sized and/or configured to fit, and therefore be stowed, within the cavity 14 of the grill body 12, as illustrated in FIG. 3. Such arrangement may enhance storability of the components of the grill 10.

The lid 54 generally may be sized to cover the cavity 14 such that any of the components stored therein do not fall out when the grill 10 is in the storable position. The lid 54 may be secured to the grill body 12 by any known mechanism, including, but not limited to, hooks, straps, and the like. Thus, the lid 54 may operate to seal the cavity 14. When the grill 10 is in the usable position, the lid 54 may be attachable to the grill body 12, e.g., a rear part of the grill body 12, such that the lid 54 may extend generally upwards and may act as a heat deflector and/or a wind shield. In one exemplary approach, the lid 54 may have a main portion 70 with tabs 72 projecting at an angle from at least one edge of the main portion 70. The tabs 72 may be insertable into or otherwise engageable with the grill body 12, for example, slots 73 in at least one of the wall portions 16 and/or ledge portions 18, to secure the lid 54 over the cavity 14 and/or extending upwards from the grill body 12. While FIG. 2 illustrates the lid 54 as having three tabs 72 along just one longitudinal edge of the main portion 70, it should be appreciated that the lid 54 may have any number of tabs 72 and on more than one edge.

The grill body 12 may include a plurality of slots 24, for example, in ledge portions 18, on opposing sides of the grill body 12. The slots 24 may be arranged in a fore and aft direction, and may each correspond to one slot 24 on an opposing side. Each slot 24 may be configured to receive at least a portion of a bracket 56. A pair of brackets 56 arranged in corresponding opposing slots 24 may be configured to receive and support the grate 62 over the cavity 14 of the grill body 12 and/or support posts 58 extending upward from the grill body 12. The support posts 58 may in turn support the skewer 60 over the cavity 14 of the grill body 12. Each support post 58 may include a nut 59 with a hook or a cradle 63 thereon, where the skewer 60 may rest on the hook 63. The vertical position of the nut 59 on the support post 58 may be adjustable. In addition or alternatively, the brackets 56 may themselves be configured to support the skewer 60. For example, the brackets 56 may include slots or cradles in or on which the skewer 60 may be inserted and/or rest. The skewer 60 may include a handle 74, which may be formed integral with the skewer 60 or may be attachable to and removable from the skewer 60, to manually rotate the skewer 60. In addition or alternatively, the skewer 60 may be connected to a motor configured to automatically rotate the skewer 60. As seen in FIG. 4, the base 30 may include a collar 76, which may be disposed on one of the support members 34, to hold the skewer 60 when the grill 10 is in the storable position and is being stored.

Figure 6A:
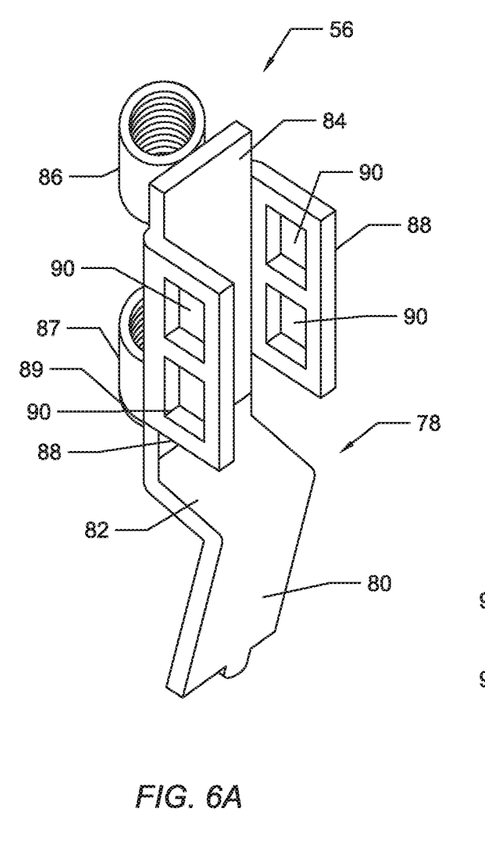
FIGS. 6A and 6B are schematic, perspective views of an exemplary bracket attachable to the grill of FIGS. 1 and 2.
Figure 6B:
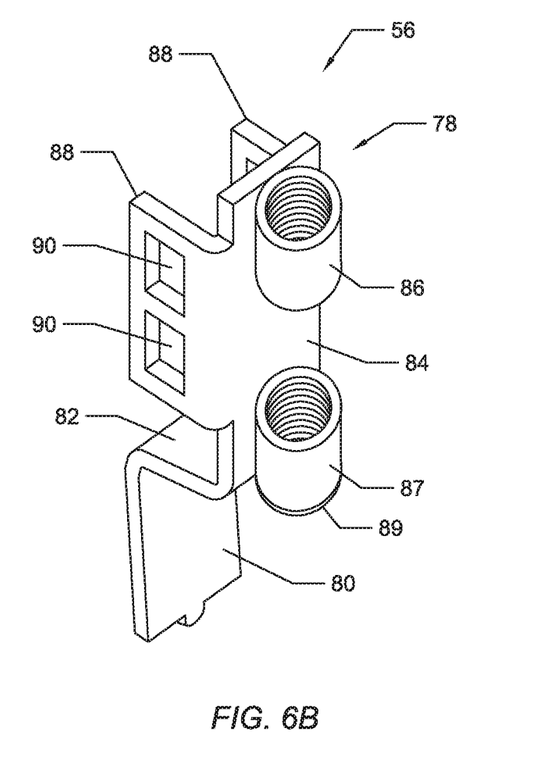

Referring now to FIGS. 6A and 6B, an exemplary bracket 56 is illustrated. The bracket 56 may include a main body portion 78. The main body portion 78 may be bent such that a first section 80 may be insertable into one of the slots 24 in the grill body 12, a second section 82 may rest on the ledge portion 18 of the grill body 12, and a third section 84 may extend upward from the grill body 12. As such, the bracket 56 may be securely attached to the grill body 12, thereby allowing for a more secure support for the support posts 58, the skewer 60, and/or the grate 62.

The bracket 56 may also include members or collars 86, 87 disposed on the main body portion 78, for example, a surface of the third section 84. The collars 86, 87 may be configured to receive a support post 58. While FIGS. 6A and 6B illustrate two collars 86, 87, it should be appreciated that there may be any number of collars 86, including just one. At least one of the collars 86, 87 may have inner threads and the support post 58 may have outer threads to engage therewith to provide a secure connection between the collars 86 and the support post 58, and further to provide adjustability of the support post 58 in a vertical direction. Alternatively, none of the collars 86, 87 may have threads, and one of the collars, for example, the bottom collar 87, may have a base 89 to support the respective support post 58. The outer threads of the support post 58 may also enable vertical positional adjustment of the nut 59 installed thereon. The support posts 58 may each include a handle or crank 61 to facilitate rotation of the support post 58 and threading of the support post 58 in and out of the collars 86. The rotation of the support posts 58 may also enable the vertical positional adjustment of the nuts 59, and therefore of the skewer 60, by nature of the threaded interaction between the support posts 58 and the respective nuts 59.

The bracket 56 may further include receiving members 88 attached to and/or extending from the third section 84. The receiving members 88 may each include channels or openings 90 to receive a portion of the grate 62. The channels or openings 90 may be arranged in a vertical direction such that a height of the grate 62 with respect to the grill body 12 may be adjustable. While FIGS. 6A and 6B illustrate the receiving members 88 as each having two channels or openings 90, it should be appreciated that there may be any number of channels or openings 90 to provide greater adjustability of the height of the grate 62, or just one channel or opening 90. In addition, while FIGS. 6A and 6B illustrate the channels or openings 90 as having a generally square shape, it should be appreciated that the channels or openings 90 may have any shape, including, but not limited to, circular, elliptical, rectangular, and the like. Further, while FIGS. 6A and 6B illustrate the bracket 56 as having two receiving members 88, it should be appreciated that there may be any number of receiving members 88. For example, there may be just one receiving member 88, which may be thicker than each of the two receiving members 88 illustrated in order to provide sufficient support for the grate 62.

Figure 7A:
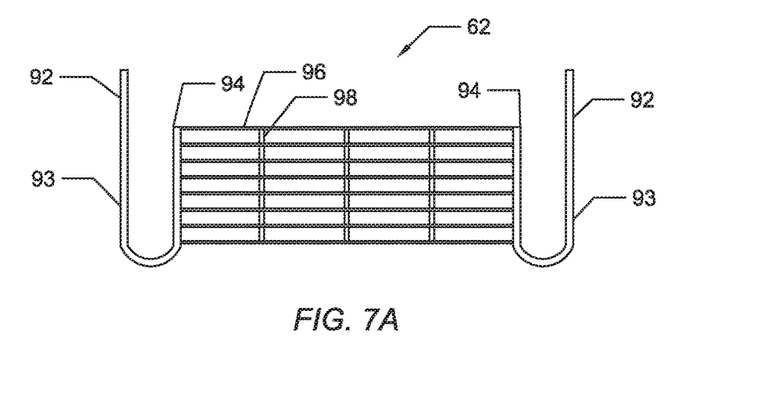
FIGS. 7A and 7B are schematic, top views of an exemplary grate attachable to the grill of FIGS. 1 and 2 in an extended state and a collapsed state, respectively.
Figure 7B:
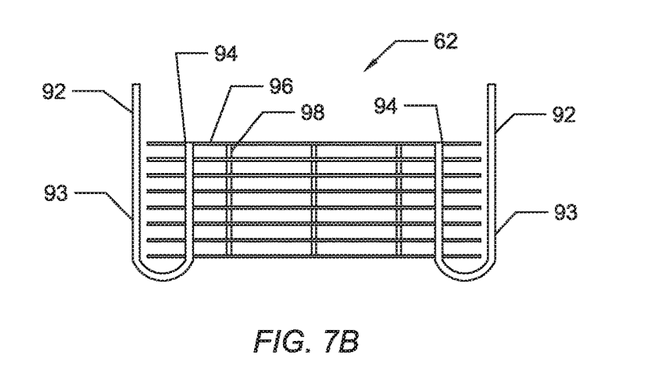

Referring now to FIGS. 7A and 7B, an exemplary grate 62 is illustrated. The grate 62 generally may be movable between an extended state, as seen in FIG. 7A, and a collapsed state, as seen in FIG. 7B. In the extended state, the grate 62 may extend beyond an opening into the cavity 14 of the grill body 12. In the collapsed state, the grate 62 may be smaller than the opening such that the grate may be inserted into and stowed within the cavity 14. To enable the grate 62 to move between the two states, the grate 62 may include end bars 92 configured to be inserted into or otherwise engage with the channels or openings 90 in corresponding brackets 56 on opposing sides of the grill body 12, as illustrated in FIG. 1. As with the channels or openings 90, the end bars 92 may have any cross-sectional shape, including, but not limited to, square, rectangular, circular, elliptical, and the like. The grate 62 may also include longitudinal bars 96 extending between the end bars 92.

In one exemplary approach, the end bars 92 may have a U-shaped or J-shaped configuration such that each end bar 92 may have two sections 93 and 94 substantially parallel with each other. The first section 93 may be inserted into the channels or openings 90, and the second section 94 may support the longitudinal bars 96. The longitudinal bars 96 may be slidable within and/or through the second section 94 to enable the grate 62 to move between the extended state and the collapsed state. One or more of the longitudinal bars 96 may have a stop to prevent the longitudinal bars 96 from completely sliding out of and disengaging from the second section 94. It should be appreciated that the longitudinal bars 96 may include any configuration to enable the movement between the extended state and the collapsed state. For example, the longitudinal bars 96 may have a series of nesting bars or tubes to provide a telescoping adjustment. The grate 62 may further include cross bars 98 crossing at least a subset of the longitudinal bars 96 to provide structural support further from the brackets 56.

Referring back to FIGS. 1 and 2, the heat deflectors 66 and the side table 68 may be removably attachable to the grill body 12. In one exemplary approach, each heat deflector 66 may have tabs 67 configured to engage with the grill body 12, for example, slots in the wall portions 16 and/or the ledge portions 18, such that the heat deflectors 66 may be oriented at an angle with respect to the grill body 12. The side table 68 may include extensions 69 that similarly may engage with openings in the wall portions 16 and/or ledge portions 18 such that the side table 68 may be substantially level. It should be appreciated that the heat deflectors 66 and the side table 68 may be attached to the grill body 12 by any known device and or mechanisms. In addition, while FIGS.

1 and 2 illustrate more than one heat deflector 66, it should be appreciated that grill 10 may include any number of heat deflectors 66. The side table 68 may similarly engage with the grill body. The coal trays 64, heat deflectors 66, and/or the side table 68 may have a smaller footprint than an opening into the cavity 14 of the grill body 12 such that they may be inserted into and stowed therein.

Figure 8:
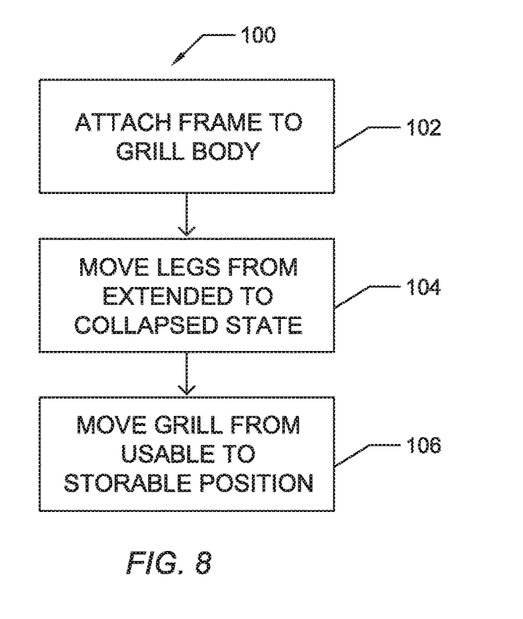
FIG. 8 is a schematic flow diagram of an exemplary method for transitioning the grill of FIGS. 1 and 2 between a storable position and a usable position.

Referring now to FIGS. 5A-5E and to FIG. 8, an exemplary method 100 for storing a grill is illustrated. While method 100 is described with respect to the grill 10, it should be appreciated that any grill 10 capable of carrying out the steps of method 100 is contemplated. Method 100 may begin at step 102 in which the frame assembly 32 may be attached to the grill body 12 of the grill 10, as illustrated in FIG. 5A. As described above, this may include inserting pin 40 and/or pin 42 into corresponding holes 22 in the grill body 12. The holes 22 have a center called a pivot point pp that is located on a side wall 43 of the grill body 12. The body has a pair of opposing side walls 43 and a pair of end walls 45. The side walls 43 have a length X along an x axis and a width Y along a y axis. The length X of the side walls have a centrally located center point CP that is positioned at one half of X and one half of Y. Referring to FIG. 5A, the center point CP and the pivot point PP are offset from one another a distance O along the x axis.

At step 104, the legs 20 of the grill 10 may be moved from an extended position to a collapsed position, as illustrated in FIG. 5C. This may include first elevating the grill 10 via the base 30, as illustrated in FIG. 5B. Where the legs 20 include a locking mechanism, step 104 may also include unlocking the locking mechanism, for example, removing locking pins, and then re-locking the locking mechanism, for example, re-inserting the locking pins, once the legs 20 are in the collapsed position. Where the base 30 includes a kickstand 50, step 104 may further include engaging the kickstand 50 such that the grill 10 may remain in an elevated position.

At step 106, the grill 10 may be moved, for example, rotated around the pins 40, 42, from the usable position, e.g., substantially horizontal with respect to a surface on which the grill 10 may be disposed, to the storable position, e.g., substantially upright with respect to the surface, as illustrated in FIGS. 5D and 5E. Where base 30 may include a lock 46, step 106 may also include engaging the lock to prevent undesired rotation of the grill 10 from the storable position. The assembly of the base 30 and the grill 10 in the storable position may then be moved, for example, wheeled, to a desired storage location. The footprint of the grill 10 may be smaller in the storable position (FIG. 5A) than in the usable position (FIG. 5E) thereby requiring a smaller storage location. The grill 10 as shown in the collapsed of FIG. 5E may be locked in this position and transported in this configuration to a small storage location. Steps 102-106 generally may be reversed when it is desired to use the grill 10. Thus, the grill 10 may be easily stored in its upright position as shown in FIG. 5E or deployed as shown in the FIG. 5A position where the base 30 can be removed and separated from the grill body 12 to create a usable position. By separating the grill body 12 from the base 30 the base 30 can be moved out of the way during grilling thus keeping the cooking area more open and improving the accessibility to the grill body 12. By contrast, by connecting the base 30 and the grill body 12 together, the grill body may be inverted to an upright position as shown n FIG. 5E, and then easily transported to a small storage area where is can be kept in this storable position. The footprint of the grill is smaller in the storable position than in the usable position.

Where the grill 10 includes additional, modular components, including, but not limited to, brackets 56, support posts 58, a grate 62, coal trays 64, heat deflectors 66, and/or a side table (or cutting board) 68, method 100 may include removing the components from the grill body 12 and inserting them into the cavity 14 of the grill body 12 prior to any one of steps 102-106. Method 100 may also include covering the cavity 14 with the lid 54, inserting the skewer 60 into the collar 76 on the base 30, and/or placing any additional components, including, but not limited to, a motor, on the frame assembly 32 of the base 30, for example, on the support members 34 and/or cross member 36.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

It will be appreciated that the aforementioned method and devices may be modified to have some components and steps removed, or may have additional components and steps added, all of which are deemed to be within the spirit of the present disclosure. Even though the present disclosure has been described in detail with reference to specific embodiments, it will be appreciated that the various modifications and changes can be made to these embodiments without departing from the scope of the present disclosure as set forth in the claims. The specification and the drawings are to be regarded as an illustrative thought instead of merely restrictive thought.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The invention claimed is:

1. A system comprising:
   a grill body having opposing side walls;
   at least two legs extending from the grill body, the legs being movable between an extended state and a collapsed state; and
   a base having a frame assembly selectively attachable and detachable to the opposing side walls of the grill body;
   wherein when the frame assembly and the grill body are releasably attached to each other, the grill body is configured to be rotatable between a usable position and a storable position, the grill body being oriented substantially horizontal in the usable position and substantially vertical in the storable position such that a footprint of the grill body is smaller in the storable position than in the usable position; and
   wherein each opposing side wall includes an aperture that is offset from a centrally located point on each side wall, the base is configured to releasably connect to at least one recess, the grill body is configured to rotate relative to the aperture.

2. The system as claimed in claim 1, further comprising a rotating member that is operable to connect the base and the grill body.

3. The system as claimed in claim 1, further comprising wheels that permit the base and grill body to be transported.

4. The system as claimed in claim 1, wherein the opposing side walls of the grill body have a center point and a pivot point, the pivot point is offset from the center point, the pivot point is configured to receive a pin that extends from the base.

5. The system as claimed in claim 1, wherein the frame assembly includes a pair of support members that are parallel to one another and are connected by a cross member, a pair of upright members extend vertically from the support members, a pin is pivotally connected to each upright member, the pin is configured to engage a pivot point that is located in the side wall.

6. The system as claimed in claim 1, further comprising a protrusion that is connected to the frame assembly, the protrusion includes a pin for engaging the side wall of the grill body.

7. A grill comprising:
a grill body having a pair of sides, and two ends, each side has a length portion along a X axis and a height portion along a Y axis, each of the sides further has a center location and a pivot point, the pivot point is offset from a center location along the X axis; legs extendable from an underside of the grill body; and
a frame assembly including a support member, a cross member, an upright member, and a pivot member, the pivot member is configured to engage the pivot point of the grill body; wherein when the frame assembly and the grill body are connected at the pivot point, the grill body is rotatable between a usable position and a storable position.

8. The grill as claimed in claim 7, wherein the pivot member includes two pins that are configured to be received within the pivot point of the grill body.

9. The grill as claimed in claim 7, further comprising a lever pivotally connected to the upright member, the lever may be actuated to permit rotation of the grill body relative to the frame assembly.

10. The grill as claimed in claim 7, further comprising a stop.

11. The grill as claimed in claim 7, further comprising a lock for engaging the grill body to prevent it from moving.

12. The grill as claimed in claim 7, further comprising a handle connected to the frame assembly.

13. The grill as claimed in claim 7, further comprising a tubular shaped member that is configured to receive a skewer.

14. A method for a grill comprising:
providing a grill having:
a grill body having a pair of sides, and two ends, each side has a length portion along a X axis and a height portion along a Y axis, each of the sides further has a center location and a pivot point, the pivot point is offset from a center location along the X axis;
a frame assembly including a support member, a cross member, an upright member, and a pivot member, the pivot member is configured to engage the pivot point of the grill body; attaching the frame assembly to the sides of the grill body by engaging the pivot member at the pivot point;
moving the grill from a stowed position to a usable position;
retracting legs of the grill from a retracted position to an extended position; and
disconnecting one of the frame assembly from the grill body, or the grill body from the frame assembly.

15. The method as claimed in claim 14, wherein a footprint of the grill is smaller in the storable position than in the usable position.

16. The method as claimed in claim 14, further comprising the step of rotating a lever to lift the grill body in an upward direction.

17. The method as claimed in claim 14, further comprising the step of rotating a lever to disconnect the frame assembly from the grill body so as to separate the frame assembly from the grill body.

18. The method as claimed in claim 14, wherein the frame assembly further includes a lock to secure the grill body in place to prevent it from rotating when transported.

19. A system comprising:
a grill body having opposing side walls;
at least two legs extending from the grill body, the legs being movable between an extended state and a collapsed state;
a base having a frame assembly selectively attachable and detachable to the opposing side walls of the grill body; and
a rotating member that is operable to connect the base and the grill body;
wherein when the frame assembly and the grill body are releasably attached to each other, the grill body is configured to be rotatable between a usable position and a storable position, the grill body being oriented substantially horizontal in the usable position and substantially vertical in the storable position such that a footprint of the grill body is smaller in the storable position than in the usable position.

20. A system comprising:
a grill body having opposing side walls;
at least two legs extending from the grill body, the legs being movable between an extended state and a collapsed state; and
a base having a frame assembly selectively attachable and detachable to the opposing side walls of the grill body;
wherein when the frame assembly and the grill body are releasably attached to each other, the grill body is configured to be rotatable between a usable position and a storable position, the grill body being oriented substantially horizontal in the usable position and substantially vertical in the storable position such that a footprint of the grill body is smaller in the storable position than in the usable position; and
wherein the opposing side walls of the grill body have a center point and a pivot point, the pivot point is offset from the center point, the pivot point is configured to receive a pin that extends from the base.

21. A system comprising:
a grill body having opposing side walls;
at least two legs extending from the grill body, the legs being movable between an extended state and a collapsed state; and
a base having a frame assembly selectively attachable and detachable to the opposing side walls of the grill body;
wherein when the frame assembly and the grill body are releasably attached to each other, the grill body is configured to be rotatable between a usable position and a storable position, the grill body being oriented substantially horizontal in the usable position and substantially vertical in the storable position such that a footprint of the grill body is smaller in the storable position than in the usable position; and wherein the frame assembly includes a pair of support members that are parallel to one another and are connected by a cross member, a pair of upright members extend vertically from the support members, a pin is pivotally connected to each upright member, the pin is configured to engage a pivot point that is located in one of the opposing side walls.

22. A system comprising:

a grill body having opposing side walls;

at least two legs extending from the grill body, the legs being movable between an extended state and a collapsed state;

a base having a frame assembly selectively attachable and detachable to the opposing side walls of the grill body; and a protrusion that is connected to the frame assembly, the protrusion includes a pin for engaging one of the opposing side walls of the grill body;

wherein when the frame assembly and the grill body are releasably attached to each other, the grill body is configured to be rotatable between a usable position and a storable position, the grill body being oriented substantially horizontal in the usable position and substantially vertical in the storable position such that a footprint of the grill body is smaller in the storable position than in the usable position.

* * * * *